United States Patent
Bjorge

(10) Patent No.: US 6,983,806 B2
(45) Date of Patent: Jan. 10, 2006

(54) AERATION DEVICE

(75) Inventor: Scott W. Bjorge, Owatonna, MN (US)

(73) Assignee: PlanetAir Turf Products, LLC, Owatonna, MN (US)

( * ) Notice: Subject to any disclaimer, the term of this patent is extended or adjusted under 35 U.S.C. 154(b) by 0 days.

(21) Appl. No.: 10/775,998

(22) Filed: Feb. 10, 2004

(65) Prior Publication Data

US 2005/0000708 A1    Jan. 6, 2005

Related U.S. Application Data

(60) Continuation of application No. 10/281,786, filed on Oct. 28, 2002, now Pat. No. 6,691,791, which is a division of application No. 09/821,373, filed on Mar. 29, 2001, now Pat. No. 6,513,603.

(51) Int. Cl.
    *A01B 45/02* (2006.01)
(52) U.S. Cl. ............................................. 172/22; 172/1
(58) Field of Classification Search ................. 172/21, 172/22, 42, 48, 79, 35, 118, 121, 122, 123, 172/125
    See application file for complete search history.

(56) References Cited

U.S. PATENT DOCUMENTS

| | | | |
|---|---|---|---|
| 1,704,986 A | 3/1929 | Marcy |
| 1,965,510 A | 7/1934 | Porter |
| 2,347,748 A | 5/1944 | Melling |
| 2,591,572 A | 4/1952 | Mascaro |
| 2,700,926 A | 2/1955 | Goit |
| 2,778,291 A | 1/1957 | Kerns |
| 3,143,090 A | 8/1964 | Cecil et al. |
| 3,148,737 A | 9/1964 | Lunsford |
| 3,393,751 A | 7/1968 | Mascaro |
| 3,522,965 A | 8/1970 | Indzeoski |
| 3,534,818 A | 10/1970 | Mascaro |
| 3,586,109 A | 6/1971 | Eversole et al. |
| 3,707,132 A | 12/1972 | Hansen |
| 3,797,577 A | 3/1974 | Killion et al. |
| 3,877,401 A | 4/1975 | Gutman |
| 3,939,917 A | 2/1976 | Reed, Jr. et al. |
| 3,993,143 A | 11/1976 | Moreland, Jr. |
| 4,020,907 A | 5/1977 | Luck |
| 4,081,034 A | 3/1978 | Hines |
| 4,148,362 A | 4/1979 | Orth |
| 4,154,305 A | 5/1979 | Prewett |
| 4,158,391 A | 6/1979 | Clements |
| 4,192,387 A | 3/1980 | Stinson |
| 4,212,357 A | 7/1980 | Clements et al. |
| RE30,705 E | 8/1981 | Hines |
| 4,326,591 A | 4/1982 | Dedoes |
| 4,336,760 A | 6/1982 | Cohen et al. |
| 4,383,580 A | 5/1983 | Huxford |
| 4,489,787 A | 12/1984 | Gary |
| 4,538,689 A | 9/1985 | Dietrich, Sr. |
| 4,550,783 A | 11/1985 | Hansen |

(Continued)

*Primary Examiner*—Victor Batson
(74) *Attorney, Agent, or Firm*—Fish & Richardson P.C., P.A.

(57) ABSTRACT

A soil aeration tine having a nose or apex end for soil penetration with a set of soil fracture faces carried thereon to fracture a portion of the soil in engagement with the soil aeration tine and a cutting tube positioned on the soil aeration tine with the soil cutting tube cutting a soil plug free of a further portion of the soil with the soil penetration tine having a lateral face for scooping out soil as the soil aeration tine is removed from the soil.

23 Claims, 2 Drawing Sheets

U.S. PATENT DOCUMENTS

| | | |
|---|---|---|
| 4,619,329 A | 10/1986 | Gorbett |
| 4,632,189 A | 12/1986 | Rizzo |
| 4,662,456 A | 5/1987 | Classen |
| 4,699,220 A | 10/1987 | Strohm |
| 4,723,607 A | 2/1988 | Hansen |
| 4,773,486 A | 9/1988 | Huber et al. |
| 4,776,404 A | 10/1988 | Rogers et al. |
| 4,791,995 A | 12/1988 | Hochlan, Jr. |
| 4,840,232 A | 6/1989 | Mayer |
| 4,867,244 A | 9/1989 | Cozine et al. |
| 4,881,602 A | 11/1989 | Hansen et al. |
| 4,899,828 A | 2/1990 | Harris |
| 4,910,948 A | 3/1990 | Nelson |
| 4,924,944 A | 5/1990 | Cozine et al. |
| 5,014,791 A | 5/1991 | Kure |
| 5,020,602 A | 6/1991 | Dellinger |
| 5,029,652 A | 7/1991 | Whitfield |
| 5,101,910 A | 4/1992 | Dawson |
| 5,119,880 A | 6/1992 | Zehrung, Jr. et al. |
| 5,152,348 A | 10/1992 | Flanagan, Sr. et al. |
| 5,172,768 A | 12/1992 | Straus |
| 5,207,278 A | 5/1993 | Hatlen |
| 5,209,306 A | 5/1993 | Whitfield |
| 5,398,767 A | 3/1995 | Warke |
| 5,460,229 A | 10/1995 | Mattis |
| 5,469,922 A | 11/1995 | Bjorge |
| 5,495,895 A | 3/1996 | Sakamoto |
| 5,570,746 A | 11/1996 | Jones et al. |
| 5,579,847 A | 12/1996 | Postema |
| 5,586,603 A | 12/1996 | Mattis |
| 5,586,604 A | 12/1996 | Postema |
| 5,623,996 A | 4/1997 | Postema |
| 5,662,172 A | 9/1997 | Brown |
| 5,673,756 A | 10/1997 | Classen |
| 5,680,903 A | 10/1997 | Oliver |
| 5,690,179 A | 11/1997 | Dickson |
| 5,709,272 A | 1/1998 | Jones et al. |
| 5,709,273 A | 1/1998 | Roth |
| 5,765,645 A | 6/1998 | Postema |
| 5,769,169 A | 6/1998 | Miksitz |
| 5,803,181 A | 9/1998 | Hsu |
| 5,806,293 A | 9/1998 | Klein et al. |
| 5,816,336 A | 10/1998 | Underhill |
| 5,823,269 A | 10/1998 | Leclerc |
| 5,868,206 A | 2/1999 | Miller |
| 5,906,090 A | 5/1999 | Knudsen |
| 5,934,055 A | 8/1999 | Steele |
| 6,003,612 A | 12/1999 | Knight et al. |
| 6,003,613 A | 12/1999 | Reincke |
| 6,038,989 A | 3/2000 | Comer et al. |
| 6,041,869 A | 3/2000 | Lewis et al. |
| 6,513,603 B2 | 2/2003 | Bjorge |
| 6,675,905 B2 * | 1/2004 | Hill et al. ..................... 172/22 |
| 6,684,960 B1 * | 2/2004 | Ng et al. ...................... 172/22 |
| 6,691,791 B2 | 2/2004 | Bjorge |
| 6,758,283 B2 * | 7/2004 | Lauer et al. .................. 172/22 |

* cited by examiner

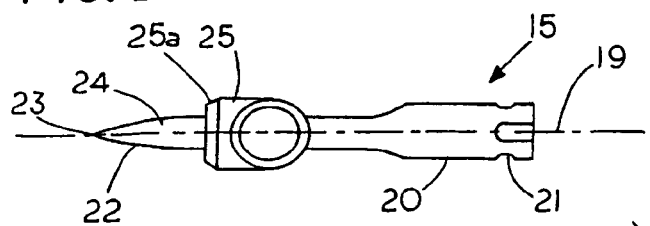
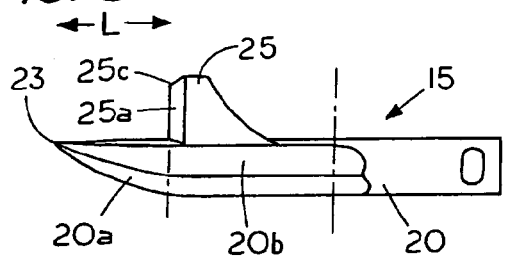
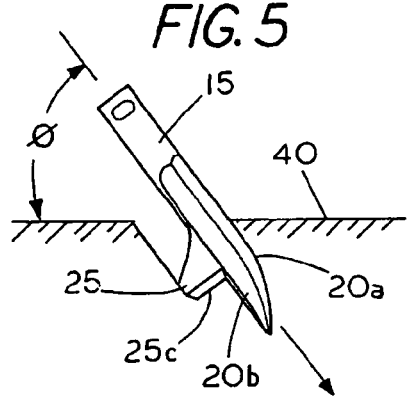
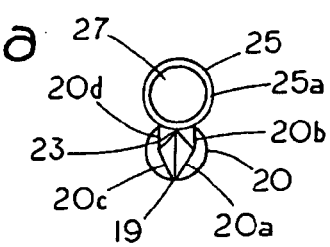
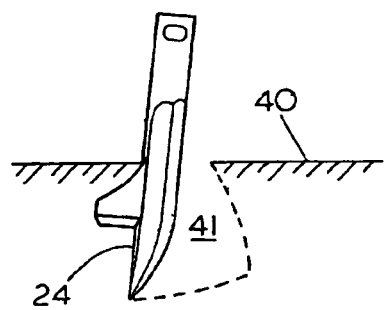
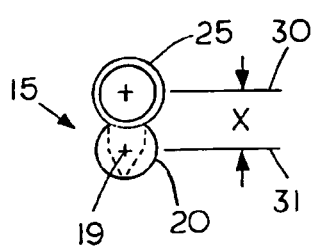
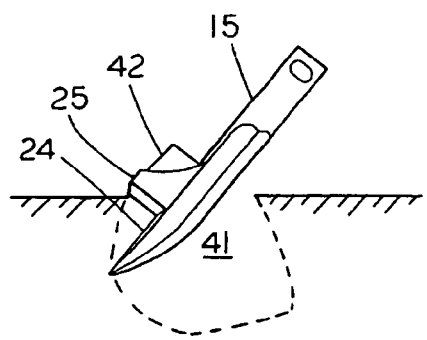
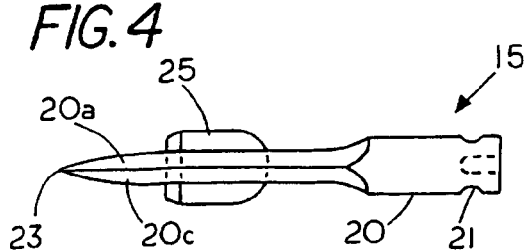

AERATION DEVICE

CROSS REFERENCE TO RELATED APPLICATION

This application is a continuation of U.S. patent application Ser. No. 10/281,786 filed on Oct. 28, 2002 now U.S. Pat. No. 6,691,791 by Scott Bjorge and entitled "Soil Aeration Tine," which is a divisional of U.S. patent application Ser. No. 09/821,373 filed Mar. 29, 2001 now U.S. Pat. No. 6,513,603 by Scott Bjorge and entitled "Soil Aeration Tine," the entirety of which are incorporated herein by reference.

FIELD OF THE INVENTION

This invention relates generally to aeration devices and, more specifically, to a soil aerator tine.

BACKGROUND OF THE INVENTION

The concept of soil aerators is known in the art. Bjorge U.S. Pat. No. 5,469,922 shows a towable soil aerator device for removing plugs of soil while forming an enlarged soil aeration pocket. The aeration tubes comprise hollow cylindrical tubes that enter the soil at an angle to cut free a cylindrical soil plug. As the soil aeration device moves forward the planetary gears in the soil aeration device cause the soil aeration tubes to pivot to form a soil aeration hole or pocket wherein the bottom portion of the soil aeration hole is larger than the top opening of the soil aeration hole.

Generally, the soil aeration tubes are used to cut a cylindrical soil plug since cutting provides less soil compaction than driving a spike into the soil. As the soil aeration tubes are extended downward into the soil they cut free a soil plug which contains grass, grass roots and soil. The soil aeration tube is then lifted out of the soil to remove the soil plug which is usually discarded on top of the soil. One of the difficulties with soil aeration devices is that a substantial amount of soil, grass and roots in the form of cylindrical plugs are left on top of the soil. These soil plugs must either be removed or allowed to break down as a result of being exposed to the elements. Generally, the larger the soil plugs the longer it takes for the soil plugs to break down.

In the present invention, the size of the soil plugs left on top of the soil is substantially decreased through an aeration tine that pierces the soil to fracture the soil around a portion of the tine while an offset soil cutting cleat or cutting tube extends partially along the tine to cut a portion of the grass and soil around the soil aeration tine. By both fracturing the soil and cutting a soil plug free of the soil on only a portion of the soil around the tine one can minimize the size of the removed soil plug. In addition, a top surface on the soil aeration tine assists in scooping out soil from the aeration pocket thereby leaving a soil aeration pocket partially formed by soil fracture, partially formed by scooping soil and partially formed by a plug cutting action without the soil compaction produced by driving a spike into the soil.

The tine for penetrating the soil includes an elongated member having a nose or apex for soil penetrating, a soil fracturing section for fracturing the soil and a soil cutting tube extending partially along the elongated member to enable the tine to form an aeration hole in the soil through a process of fracturing and soil removal to thereby minimize the size of the soil plugs removed from the soil.

DESCRIPTION OF THE PRIOR ART

U.S. Pat. No. 5,469,922 discloses a soil aerator having a planetary aeration system for forming a soil aeration pocket.
U.S. Pat. No. 4,773,486 discloses a tine wheel having a coring tine positioned at the end of the tine.

SUMMARY OF THE INVENTION

A soil aeration tine having a nose or apex end for soil penetration with a soil fracture section to fracture a portion of the soil in engagement with the soil aeration tine and a cutting tube positioned aft of an apex end of the cutting tube but proximate the soil aeration tine to allow the soil cutting tube to cut a soil plug free of a further portion of the soil. A soil lifting face allows for scooping soil out if the soil aeration tine is rotationally removed from the soil.

BRIEF DESCRIPTION OF THE DRAWINGS

FIG. 2 is a top view of an aeration tine;
FIG. 3 is a side view of the aeration tine of FIG. 2;
FIG. 3a is a front view of the aeration tine of FIG. 2;
FIG. 3b is a back view of the aeration tine of FIG. 2;
FIG. 4 is a bottom view of the aeration tine of FIG. 2;
FIG. 5 is a partial side view showing the aeration tine of FIG. 2 penetrating the soil;
FIG. 6 is a partial side view showing the aeration tine of FIG. 2 partially rotated within the soil;
and
FIG. 7 is a partial side view showing the aeration tine of FIG. 2 emerging from the soil;

DESCRIPTION OF THE PREFERRED EMBODIMENT

Figure 1:
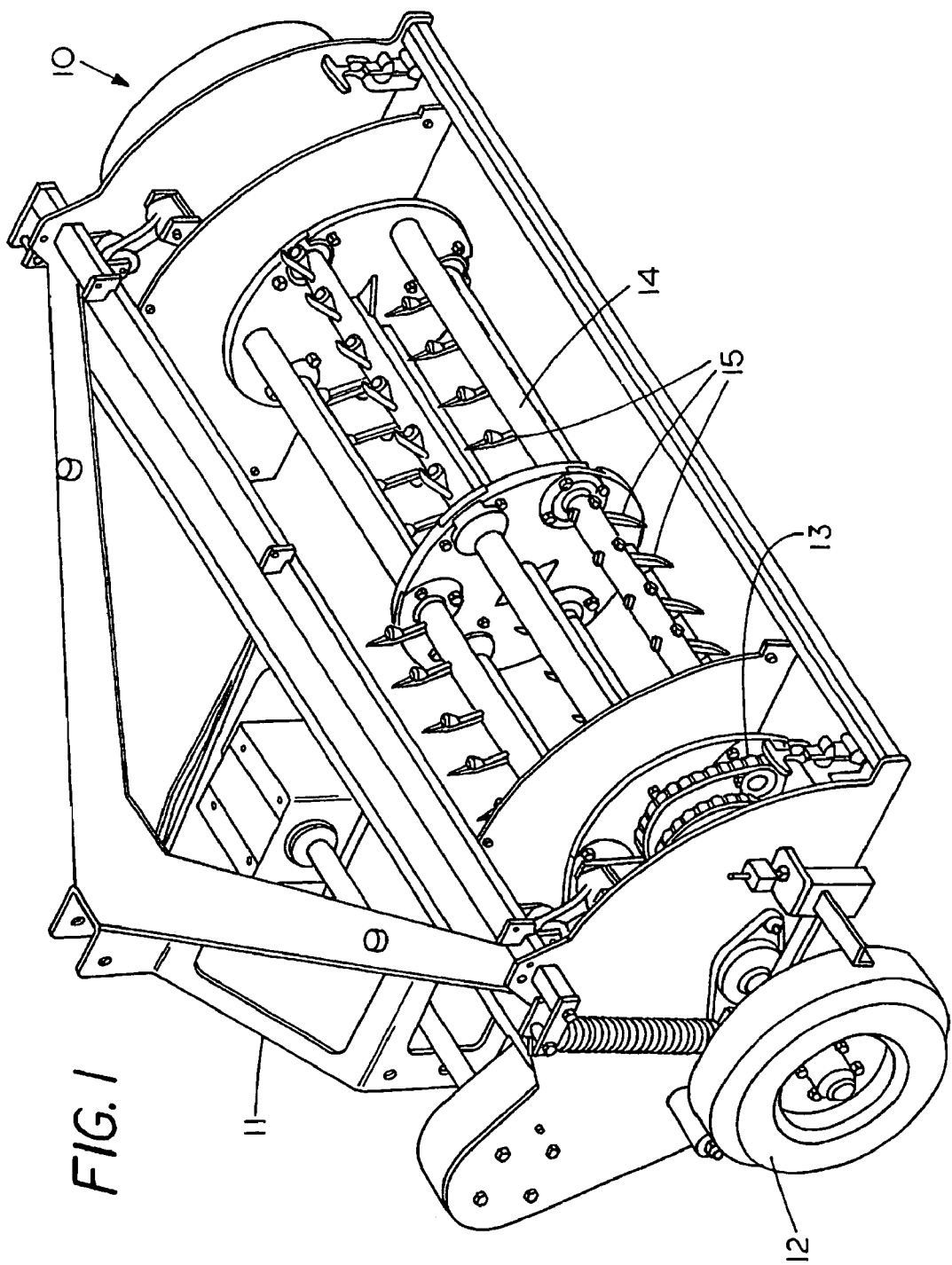
FIG. 1 is a perspective of a soil aerator device having a set of aeration tines.

FIG. 1 is a perspective view of a pull type soil aeration device 10 having a frame 11 supported by a pair of wheels 12. A gear mechanism 13, which is connected to the power take off shaft of a tractor (not shown), rotates the tine holders 14 which contain a set of soil aeration tines 15. In the embodiment shown the aeration tines are located on parallel members and rotate in an epicycle or planetary manner. A soil aeration device providing planetary motion is more fully described in Bjorge U.S. Pat. No. 5,469,922 titled Soil Aerator issued Nov. 28, 1995 and is incorporated herein by reference.

FIG. 2 shows a top view of soil aeration tine 15 capable of both fracturing and removing soil. Soil aeration tine 15 comprises an elongated member 20 having a central axis 19. Elongated member 20 has a first section 22 terminating in an apex end 23 and a second section or mounting end 21 for mounting elongated member 20 on a soil aeration device. Mounted to elongated member 20 is a cylindrical soil cutting tube 25 which is positioned rearwardly or aft of apex end 23 so that when apex end 23 of elongated member 20 is axially driven into a patch of soil the apex end 23 of elongated member 20 penetrates the patch of soil before the soil cutting tube 25 engages the soil. As the first section 22 penetrates the soil it fractures the soil to form a partial soil aeration pocket. Next, the soil cutting tube 25 which is positioned axially rearwardly of the apex 23 and has an annular cutting edge 25c and a conically tapered surface 25a engages the soil aft of the apex end and proximate the soil aeration tine 15 to cut a plug of the soil free of the soil. Thus the fracturing of the soil occurs in the soil around the lower portion of the hole and both fracturing and soil removal occurs in the soil zone proximate the cutting tube which results in a soil aeration pocket in the soil where the soil aeration pocket is larger than the soil plug cut free of the soil and also without the soil compaction that would occur if a spike were driven downward into the soil.

FIG. 3 shows a side view of soil aeration tine 20 illustrating a portion of a divergent soil fracturing section 22 which includes an upwardly curving soil fracturing face 20a and an upwardly curving soil fracturing face 20b that terminates at apex end 23. FIG. 3a shows the opposite side of soil aeration tine 15 illustrating the other side of the divergent soil fracturing section 22 which includes identical upwardly curving soil fracturing faces 20c and 20d that terminates at apex end 23. A soil lifting face 24 extends laterally from side-to-side of soil aeration tine 15. The soil lifting face 24 forms a scoop or spade so that when the soil aeration tine is rotationally removed from the soil the soil face 24 can lift or scoop soil from the soil aeration pocket.

The soil cutting tube 25 has a leading and annular cutting edge 25c that diverges outwardly along annular face 25a to the cylindrical shaped soil cutting tube 25. The cutting edge 25c of cutting tube 25 is positioned a distance L rearward of the apex end 23 of soil aeration tine 15 to enable the soil fracturing section 22 to penetrate and fracture the soil before the soil aeration tube cuts a soil plug free of the soil. In the embodiment shown the soil cutting tube is positioned at least one and one half inches rearward of the apex end to ensure that the length of the soil plug is kept to a minimum. On the other hand the soil cutting tube should extend sufficiently far along elongated member 20 so as to ensure that one can cut through the top layer of grass and soil. Thus, in the embodiment shown in the drawings the end of the tine 15 lacks an end coming device.

FIG. 3b shows a back view of soil aeration tine 15 with a first line 31 extending outward from the central axis 19 of elongated member 20 and a second line 30 extending outward from the geometric center of cutting tube 25 with the distance between the centers indicated by the dimension x. That is, FIG. 3b illustrates that the cutting tube is laterally offset from the elongated member 20 so that cutting tube 20 and elongated member 20 enter the soil in a side by side condition.

FIG. 4 is a bottom view of soil aeration tine 15 illustrating that the soil fracturing faces 20a and 20c extend axially along elongated member 20 and terminate at apex end 23. Thus the under side of aeration tine 15 presents soil fracturing surfaces 20a and 20c while the top side of soil aeration tine 15 presents the latterly offset and rearwardly positioned cutting tube 25 for cutting the soil to remove a plug of soil and grass.

FIG. 5 is a partial schematic illustrating how soil aeration tine 15 penetrates a patch of soil 40 at an acute angle .phi. with respect to the top soil. In the first step the soil aeration soil fracturing surfaces 20a, 20b on one side of elongated member 20 and the soil fracturing surfaces 20c and 20 located on the opposite side of the elongated member penetrate the soil with the soil fracturing surfaces entering the soil at an acute angle causing the soil proximate the soil aeration tine 15 to fracture upward rather than compact. That is the acute angle penetration of the soil fracturing surfaces with the fracturing surfaces facing upward produces an upward component that forces the soil upward. As the soil can fracture and move upward the resistance to soil compaction above the soil aeration tine 15 is less than the resistance to soil compaction in the lateral direction. That is, lateral displacing soil produces increased soil compaction since the soil must compact against itself. Thus avoiding direct lateral compaction inhibits soil compaction. At the same tine the soil fracturing faces fracture the portion of the soil located ahead of the soil aeration tine the cutting edge 25c, which trails the apex end 23, cuts a soil plug free of the soil. In the embodiment shown the cutting edge 25c extends substantially perpendicular to soil aeration tine 15 to enable the soil aeration tube 25 to capture a soil plug aft of the apex end 23 as the soil aeration tine 15 is driven axially into the soil. It should be pointed out that although multiple soil fracturing faces are shown it is envisioned that only a single soil fracturing surface could be used.

FIG. 6 illustrates the step when the soil aeration tine is rotated in a clockwise direction as the tine is being moved forward. This rotational action results in an aeration pocket 41 being formed in the region first penetrated by the soil aeration tine.

FIG. 7 illustrates the further enlargement of the soil aeration pocket 41 as the soil aeration tine 15 continues in a compound motion as a result of the planetary action that drives the tine rearward during the rotation of the support mechanism and forward due to the pulling of the soil aeration device and the rotation of the aeration tine. As a result, the compound rotation causes the soil aeration tine top face 24 to lift or scoop soil from the aeration pocket while a cut soil plug 42 is held in cutting tube 25 to be disposed of on the ground when the soil aeration tube 15 exits the soil. The result is that one can form a soil aeration pocket 41 with a minimum of soil compaction and a minimum of displaced soil as the soil aeration tine with the aft cutting tube removes a soil plug of substantially smaller volume than a soil aeration tube located on an apex end of a soil aeration tube. Consequently, less soil is left on top of the soil since the soil plugs formed by the present method are smaller than soil plugs formed by the end core method. Yet at the same tine the aeration holes 41 formed in the soil are as large or larger than holes formed by a conventional cylindrical cutting tubes.

Thus the method of making a soil aeration hole 41 comprises the step of extending an elongated member 20 having a lateral face 24 on one side and a soil diverging section formed by faces 20 and 20c on the other side into the soil to fracture the soil proximate the diverging faces. In addition, one cuts a soil plug free of the soil with the soil aeration tube 25 by cutting the soil plug from the soil located rearward and lateral of the diverging faces 20 and 20c. By rotationally removing the elongated member 20 one can free the soil plug and form a soil aeration hole 41 having a top opening smaller than a bottom opening as shown in FIG. 7. Also by rotationally removing the elongated member 20 with the apex end 23 and lifting surface 24 one can partially scoop out soil with the soil lifting face 24 on the elongated member.

In the embodiments shown the soil cutting tube 25 has an external diameter larger than the external diameter of the aerator tine. Although, it is submitted that the diameter of the soil cutting tube 25 can be governed by other factors such as soil types and soil conditions.

Thus the soil aerator tine 15 can include at least one soil fracturing face in a diverging section 22 which diverges in a direction rearward from an apex end 23 on soil aerator tine 15 and in a direction away from a lifting face 24 on soil aerator tine 15. The soil aeration device 15 illustrated in FIG. 3a shows two soil fracturing faces 20a and 20c symmetrically positioned around a central axis 19 extending through the soil aeration tine elongated member 20. A review of FIG. 3a shows that apex end 23 on soil aeration tube 22 is located lateral of the central axis 19 extending through the soil aeration tube 15. By having the soil diverging faces forming an off center apex 23 on one side of the soil aeration tine 15 the soil against the soil face 24 is penetrated without compaction while the soil above the soil aeration fracture faces is forced away from the soil aeration tube. When the soil aeration tube is driven at an acute angle into the soil the diverging fracturing surfaces move the soil upward which fractures the soil without compacting the soil.

I claim:

1. A soil aerator comprising:
   a frame member;
   a plurality of tine racks rotatably coupled to the frame member, each tine rack having a longitudinal axis;
   a plurality of aeration tines removably mounted to each tine rack, each aeration tine including a soil fracturing face that terminates at an apex portion; and
   a planetary gear system to rotate the tine racks about their respective longitudinal axes and revolve each of said tine racks about a second axis substantially parallel to said longitudinal axes to urge said aeration tines into a ground surface to form an aeration pocket in a compound motion while at least a portion of said aeration tines are in the ground surface.

2. The soil aerator of claim 1, wherein each aeration tine includes a cutting tube spaced apart from the apex portion.

3. The soil aerator of claim 2, wherein the cutting tube has a cylindrical shape.

4. The soil aerator of claim 3, wherein the cuffing tube has a conically tapered soil-cutting end.

5. The soil aerator of claim 2, wherein the cutting tube is positioned at least about one and one-half inches rearward of the apex portion.

6. The soil aerator of claim 1, wherein the planetary gear system includes at least one planetary gear that rotates around a sun gear.

7. The apparatus of claim 6, wherein the planetary gear system drives the aeration tine into the ground surface and the soil fracturing faces fracture soil to thereby form the aeration pocket.

8. The apparatus of claim 7, wherein each aeration tine includes a cutting tube spaced apart from the apex portion and the planetary gear system drives the aeration tine so that the apex portion penetrates the ground surface before the cutting tube contacts the ground surface.

9. The soil aerator of claim 1, further comprising a plurality of wheels and a tractor hitch coupled to the frame member.

10. The soil aerator of claim 1, further comprising a drive means to impart motion to the planetary gear system.

11. The soil aerator of claim 1, wherein the revolution about the second axis is counterclockwise and the rotation about the longitudinal axes is clockwise when viewed from a first side of said frame member.

12. A soil aerator comprising:
   a plurality of holder means rotatably coupled to a frame member, each of said holder means having a longitudinal axis;
   a plurality of means for creating an aeration pocket coupled to each of said plurality of holder means, each of said aeration means having a soil fracturing means that terminates at an apex portion; and
   a planetary drive means to rotate the holder means about their respective longitudinal axes and revolve the holder means about a second axis substantially parallel to said longitudinal axes to urge said aeration means into a ground surface to form aeration pockets in a compound motion while at least a portion of said aeration means are in the ground surface.

13. The soil aerator of claim 12, wherein each aeration means includes a soil cutting means spaced apart from the apex portion.

14. The soil aerator of claim 13, wherein the soil cutting means is positioned at least about one and one-half inches rearward of the apex portion.

15. The soil aerator of claim 12, wherein the planetary drive means includes at least one planetary gear that revolves around a sun gear.

16. The apparatus of claim 12, wherein the planetary drive means imparts a compound motion such that the apex portion of each aeration means is driven into the ground surface and the soil fracturing means fracture soil to thereby form the aeration pockets.

17. The soil aerator of claim 12, further comprising a motor to drive the planetary drive means.

18. The soil aerator of claim 12, wherein the revolution about the second axis is counterclockwise and the rotation about the longitudinal axes is clockwise when viewed from a first side of said frame member.

19. A method for forming an aeration pocket in a ground surface, the method comprising:
   revolving a tine rack around a central axis spaced apart from a longitudinal axis of the tine rack, the tine rack having at least one aeration tine mounted thereto, wherein each aeration tine has at least one fracturing face that terminates at an apex portion; and
   rotating the tine rack about its longitudinal axis, thereby causing the aeration tine to move in a compound motion while at least a portion of said aeration tine is in a ground surface such that the apex portion penetrates the ground surface to form an aeration pocket.

20. The method of claim 19, wherein the tine rack is coupled to a planetary gear of a planetary gear system, the gear system causing the tine rack to revolve around the central axis and to rotate about the longitudinal axis.

21. The method of claim 19, wherein the aeration tine includes a cutting tube spaced apart from the apex portion.

22. The method of claim 21, wherein the aeration tine penetrates the ground surface before the soil cutting tube contacts the ground surface.

23. The method of claim 22, further comprising:
   driving the apex portion into the ground surface;
   fracturing soil with the soil fracturing face; and
   removing a plug of soil with the soil cutting tube to thereby form the aeration pocket.

\* \* \* \* \*

UNITED STATES PATENT AND TRADEMARK OFFICE
CERTIFICATE OF CORRECTION

PATENT NO. : 6,983,806 B2  
APPLICATION NO. : 10/775998  
DATED : January 10, 2006  
INVENTOR(S) : Scott W. Bjorge It is certified that error appears in the above-identified patent and that said Letters Patent is hereby corrected as shown below:

Column 5,  
Line 29, delete "3" and insert -- 2 --.  
Line 29, delete "cuffing" and insert -- cutting --.

Signed and Sealed this

Twenty-seventh Day of June, 2006

JON W. DUDAS  
*Director of the United States Patent and Trademark Office*